United States Patent
Tanaka et al.

[11] Patent Number: 6,016,662
[45] Date of Patent: Jan. 25, 2000

[54] VEHICULAR AIR CONDITIONING APPARATUS FOR EFFECTIVELY COOLING A MAIN COOLING UNIT AND AN ADDITIONAL COOLING UNIT

[75] Inventors: Hisashi Tanaka, Torrance; Yuichi Shirota, Anjo; Hiroki Matsuo, Kariya; Hikaru Sugi, Nagoya; Masami Konaka, Kariya; Kazushi Yamamoto, Ama-gun; Seiji Miwa; Tetsuji Nobuta, both of Kariya, all of Japan

[73] Assignee: Denso Corporation, Kariya, Japan

[21] Appl. No.: 08/867,432

[22] Filed: Jun. 2, 1997

[30] Foreign Application Priority Data

Jun. 3, 1996 [JP] Japan .................................. 8-139906
Oct. 30, 1996 [JP] Japan .................................. 8-287978

[51] Int. Cl.[7] ............................................... F25B 5/00
[52] U.S. Cl. ................... 62/199; 62/524; 62/185; 62/430; 62/437
[58] Field of Search ........................... 62/430, 185, 199, 62/437, 524

[56] References Cited

U.S. PATENT DOCUMENTS

| | | | |
|---|---|---|---|
| 4,123,914 | 11/1978 | Perez et al. | 62/524 X |
| 4,918,936 | 4/1990 | Sakamoto | 62/430 X |
| 4,959,974 | 10/1990 | Kusakabe | 62/199 X |
| 5,465,591 | 11/1995 | Cur et al. | 62/199 X |

FOREIGN PATENT DOCUMENTS

| | | |
|---|---|---|
| 62-149509 | 7/1987 | Japan . |
| B2-5-24418 | 4/1993 | Japan . |
| 7-218011 | 8/1995 | Japan . |

OTHER PUBLICATIONS

Translation of applicant's previously cited document JA 7,218,011, Takano et al., Aug. 1995.

*Primary Examiner*—Henry Bennett
*Assistant Examiner*—Marc Norman
*Attorney, Agent, or Firm*—Harness, Dickey & Pierce, PLC

[57] ABSTRACT

A main evaporator cools a driver's compartment of a vehicle while a cooling storage evaporator cools cooling storage packs that are used in cooling a sleeping compartment. Refrigerant is supplied to the main evaporator at the actuation of a first solenoid valve while refrigerant is supplied to the cooling storage evaporator at the actuation of a second solenoid valve. If a first switch is being actuated after the completion of the cooling storage operation of the cooling storage evaporator on the cooling storage packs and the temperature of the cooling storage packs is no more than a preset temperature, for example, −5° C., FIR control is performed for alternately actuating the first solenoid valve and the second solenoid valve based on a predetermined time ratio (for example, 10 minutes 15 seconds).

21 Claims, 10 Drawing Sheets

1

VEHICULAR AIR CONDITIONING APPARATUS FOR EFFECTIVELY COOLING A MAIN COOLING UNIT AND AN ADDITIONAL COOLING UNIT

CROSS-REFERENCE TO RELATED APPLICATIONS

This application is related to and claims priority from Japanese Patent Application No. Hei-8-139906 filed on Jun. 3, 1996 and from Japanese Patent Application No. Hei-8-287978 filed on Oct. 30, 1996, the contents of which are hereby incorporated by reference.

BACKGROUND OF THE INVENTION

1. Field of the Invention

The present invention relates to a vehicular air conditioning apparatus which includes a cooling storage evaporator unit for cooling a cooling storage unit such as a refrigerator, a cooling storage medium and the like.

2. Description of Related Art

As one example of a vehicular air conditioning apparatus that is mounted on trucks or the like, a prior application of the applicant, Japanese Patent Laid-Open Publication No. Sho-62-149509, discloses a vehicular air conditioning apparatus which includes a main evaporator for cooling a passenger compartment and a cooling storage evaporator for cooling a cooling storage medium. In this air conditioning apparatus, the cooling storage medium cools a sleeping compartment of the truck or the like even when the engine is at a stop.

FIG. 12 shows the construction of a refrigerating cycle of the aforementioned air conditioning apparatus. As shown in FIG. 12, this air conditioning apparatus includes a compressor 1, a condenser 2, a receiver 3, a temperature expansion valve 4 and a main evaporator 5, all of which are connected by a refrigerant line 6 that forms a closed loop. The air conditioning apparatus further includes a constant pressure valve 7, a cooling storage evaporator 8 and a check valve 9, which are all provided in parallel with the temperature expansion valve 4 and the main evaporator 5. The cooling storage evaporator 8 includes an evaporator pipe that has a zigzag shape and cooling storage medium packs coupled to the evaporator pipe. The air conditioning apparatus additionally includes a solenoid valve 11 provided between a line branch point 10 and the temperature expansion valve 4, and a second solenoid valve 12 provided between the line branch point 10 and the constant pressure valve 7.

When an air conditioning switch and a cooling storage switch are both actuated, a controller (not shown) performs FIR (Freezing by Intermittent Running) control to alternately actuate the first solenoid valve 11 and the second solenoid valve 12 based on a predetermined time ratio (for example, 60 seconds for actuating the first solenoid valve 11:15 seconds for actuating the second solenoid valve 12) so that the cooling storage medium is also cooled while cooling the passenger compartment. When the cooling operation of the cooling storage medium is finished, the second solenoid valve 12 is deactuated, and the supply of refrigerant to the cooling storage evaporator 8 is terminated. Then, when the sleeping compartment switch is actuated, the sleeping compartment is cooled by the latent heat of melting of the cooling storage medium.

With the above-described air conditioning apparatus, the sleeping compartment can be cooled even if the engine is turned off and thus, this air conditioning apparatus promotes the conservation of energy and contributes to the lessening of noise and air pollution. However, according to research performed by the inventors of the present invention, the aforementioned air conditioning apparatus that is equipped with the cooling storage evaporator 8 still needs to be improved.

That is, after the cooling storage evaporator 8 completes the cooling operation of the cooling storage medium, the second solenoid valve 12 is deactuated and thus, the supply of refrigerant to the cooling storage evaporator 8 stops. Here, while the cooling storage medium of the cooling storage evaporator 8 remains frozen, the refrigerant pressure at the outlet of the cooling storage evaporator 8 will remain at a low level (for example, 0.5 kg/cm$^2$ abs) and will be significantly lesser than the refrigerant pressure at the outlet of the main evaporator 5 (which has a pressure of, for example, 2.0 kg/cm$^2$ abs). In this way, refrigerant at the outlet side of the main evaporator 5 will not flow back to the outlet side of the cooling storage evaporator 8 via the check valve 9.

However, when the cooling storage medium of the cooling storage evaporator 8 begins to melt, the refrigerant pressure inside the cooling storage evaporator 8 rises and thus, the refrigerant pressure at the outlet of the same cooling storage evaporator 8 also rises. As a result, the difference in pressures between the inlet and the outlet sides of the check valve 9 decreases. Thus, as shown in FIG. 13, with lesser pressure difference between the inlet and the outlet sides of the check valve 9, the amount of refrigerant flowing back (that is, leaking) from the outlet side of the main evaporator 5 to the outlet side of the cooling storage evaporator 8 via the check valve 9 begins to gradually increase. Accordingly, the amount of refrigerant that tends to remain inside the cooling storage evaporator 8 will increase, thus leading to reduced refrigerating capacity of the main evaporator 5.

SUMMARY OF THE INVENTION

In view of the foregoing problems of the prior art in mind, it is a goal of the present invention to provide a vehicular air conditioning apparatus which includes a first evaporator unit and a second evaporator unit provided in parallel with the first evaporator unit and which can prevent the leakage of refrigerant into the second evaporator unit.

A first aspect of the present invention provides a vehicular air conditioning apparatus which includes a refrigerating cycle, a cooling operation completion determination unit, and a refrigerant supply control unit. The refrigerating cycle includes a first evaporator unit that is capable of cooling a cabin of a vehicle and a second evaporator unit that is capable of cooling a cooling target. The second evaporator unit is disposed in parallel with the first evaporator unit. The cooling operation completion determination unit can determine that the second evaporator unit has completed cooling the cooling target. The refrigerant supply control unit is for selectively supplying refrigerant to the first evaporator unit and to the second evaporator unit. The refrigerant supply control unit supplies refrigerant to the second evaporator unit even after the cooling operation completion determination unit determines that the second evaporator unit has completed cooling the cooling target.

In this way, because refrigerant is supplied to the second evaporator unit even after it completes cooling the cooling target, the bleeding of refrigerant into the second evaporator unit and the stay of the same refrigerant inside the same evaporator unit can be effectively prevented. Accordingly, the air conditioning apparatus can perform more efficient air conditioning and cooling operations.

Preferably, the cooling operation completion determination unit includes a temperature sensor that can detect the temperature of the cooling target. Here, the cooling operation completion determination unit determines that the second evaporator unit has completed cooling the cooling target when the temperature of the cooling target is no more than a predetermined temperature. In this way, the detection of the completion of the cooling operation of the second evaporator unit can be performed with a simple construction.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are described hereinafter with reference to the accompanying drawings.

Figure 5:
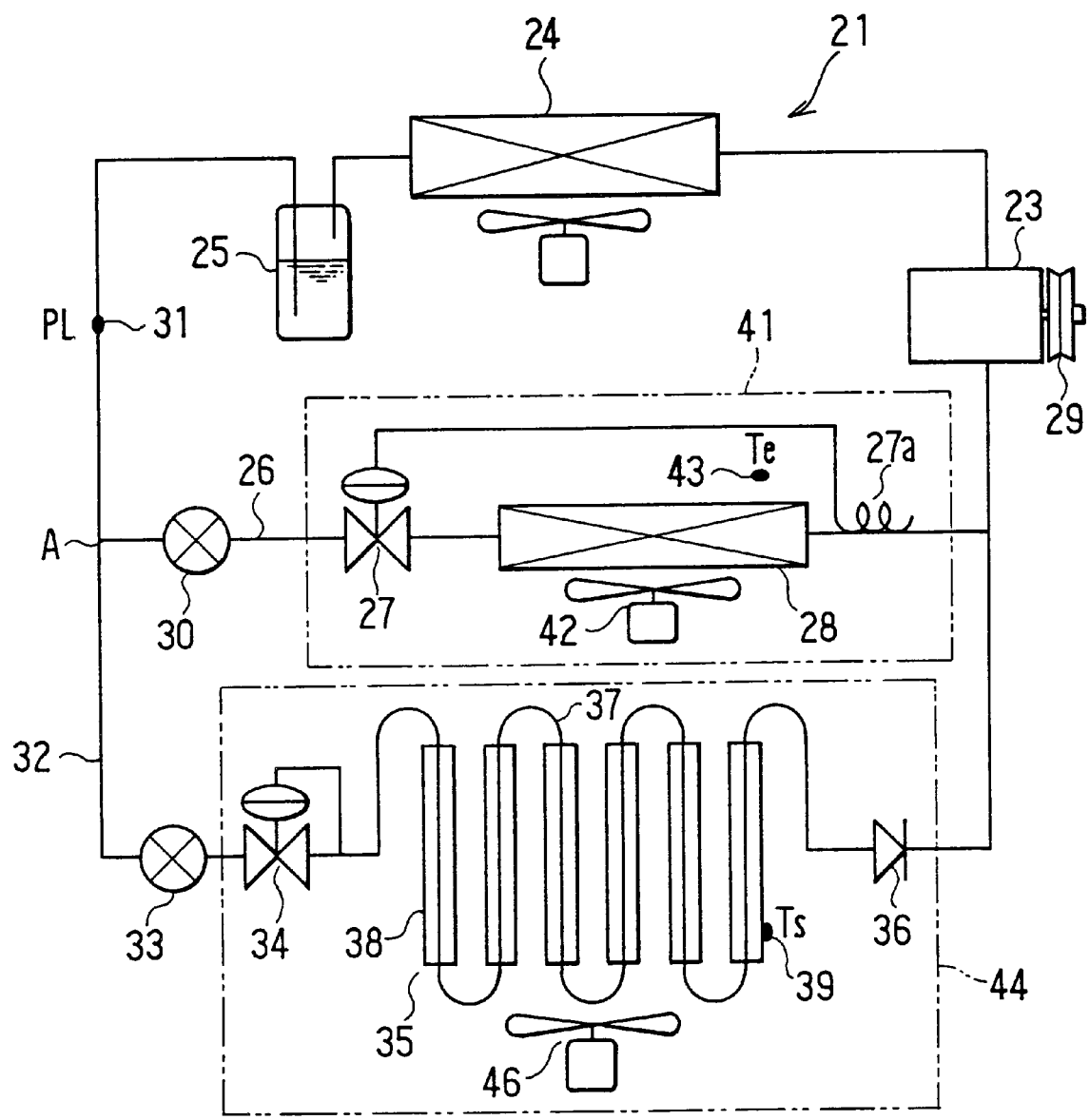
FIG. 5 is a diagram showing the construction of the refrigerating cycle of the air conditioning apparatus of the present invention.

As shown in FIG. 5, a refrigerating cycle 21 of an air conditioning apparatus according to the present invention includes a compressor 23 for compressing refrigerant vapor, a condenser 24 which condenses high temperature and high pressure refrigerant vapor from the compressor 23 into liquid refrigerant, and a receiver 25 which separates vaporous components and liquid components of the refrigerant from the condenser 24 and which temporarily stores the liquid refrigerant. The compressor 23, the condenser 24 and the receiver 25 are all connected in series. The refrigerating cycle 21 further includes a main refrigeration unit 26, which is used in front type air conditioner and which is provided between an outlet side of the receiver 25 and an inlet side of the compressor 23. The compressor 23 is connected to a driving shaft of an engine via a magnet clutch 29. The compressor 23 is activated with the actuation of the magnet clutch 29.

The main refrigeration unit 26 includes a temperature expansion valve 27 and a main evaporator 28 which may also be referred to as the first evaporator. The temperature expansion valve 27 acts as a restrictor when it sprays liquid refrigerant from the receiver 25 to cause the refrigerant liquid to suddenly expand and turn into mist. The main evaporator 28 vaporizes the misty refrigerant from the temperature expansion valve 27 by facilitating heat exchange with external air. A temperature sensing bulb 27a of the temperature expansion valve 27 is coupled to a pipe at the outlet side of the main evaporator 28. A first solenoid valve 30 which opens and closes the main refrigeration unit 26 is provided at the upstream side of the temperature expansion valve 27. Moreover, the refrigerating cycle 21 additionally includes a pressure sensor 31 which is for detecting a refrigerant pressure PL and which is provided proximate to the outlet side of the receiver 25. The detected refrigerant pressure PL of the pressure sensor 31 is used in determining abnormally low refrigerant pressure (that is, deficiency in the amount of refrigerant) and in driving a constant pressure cut switch that inhibits operations of the compressor 23.

A secondary refrigeration unit 32 is provided between the outlet side of the receiver 25 and the inlet side of the compressor 23. The secondary refrigeration unit 32 is connected in parallel with the main refrigeration unit 26. This secondary refrigeration unit 32 includes a second solenoid valve 33, a constant pressure expansion valve 34 which can restrict the flow of refrigerant, a cooling storage evaporator 35 which may also be referred to as a secondary evaporator and a check valve 36. The cooling storage evaporator 35 is provided in parallel with the main evaporator 28. The aforementioned pressure sensor 31 is provided upstream of a branch point A of the main refrigeration unit 26 with the secondary refrigeration unit 32.

Figure 7:
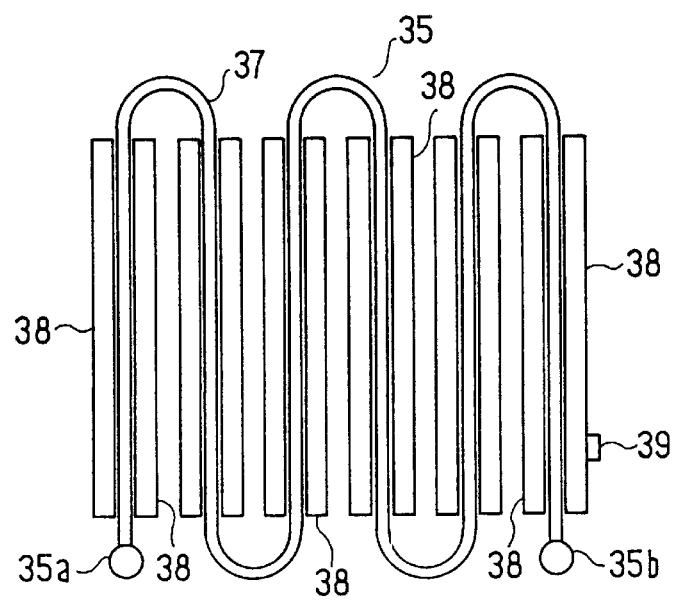
FIG. 7 is a diagram showing the construction of a cooling storage evaporator of the air conditioning apparatus of the present invention.

As shown in FIG. 7, the cooling storage evaporator 35 includes a flat tube 37 provided between a refrigerant inlet port 35a and a refrigerant outlet port 35b and a plurality of cooling storage packs 38. The flat tube 37 may be made up of, for example, aluminum and has a plurality of zigzag portions along its entire length. The cooling storage packs 38, which are to be cooled, are attached proximate to the flat tube 37 with air passages being defined between the cooling storage packs 38 and the surface of the flat tube 37. Each of the cooling storage packs 38 includes a bag made of nylon, polyethylene and the like and water or soft gel-like cooling storage medium enclosed inside the bag. A cooling storage sensor 39 is provided at one end of the flat tube 37. The cooling storage sensor 39 detects a temperature Ts of the cooling storage packs 38.

Figure 6:
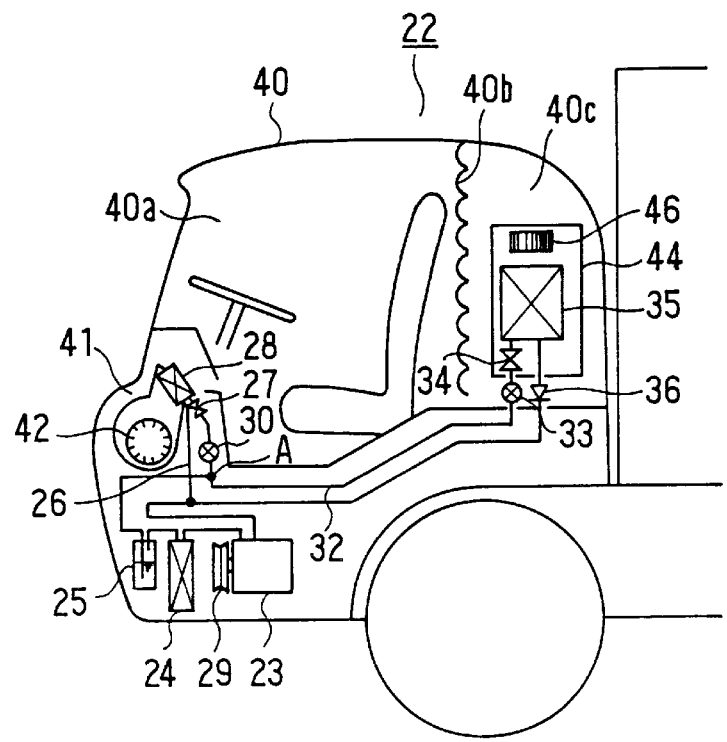
FIG. 6 is a schematic cross-section view of the air conditioning apparatus installed in a truck.

As shown in FIG. 6, a driver's compartment 40a is provided in a front part of a cabin 40 of a truck 22. In addition, a sleeping compartment 40c is provided behind the driver's compartment 40a. A curtain 40b defines a boundary between the driver's compartment 40a and the sleeping compartment 40c. The main evaporator 28 and the temperature expansion valve 27 of the main refrigeration unit 26 are accommodated inside an air conditioning unit 41 and placed in the front part of the cabin 40. The compressor 23, the condenser 24, the receiver 25 and the like are provided below the cabin 40.

The air conditioning unit 41 includes a blower fan 42, a heater core, an air mixture damper, a wind flow switching damper and the like. This air conditioning unit 41 blows cold air or hot air to the cabin 40 via air blow outlets. The air conditioning unit 41 is provided with an evaporator temperature sensor 43 (shown in FIG. 5) for detecting a temperature Te of the air that has just passed through the main evaporator 28. The temperature Te detected by the evaporator temperature sensor 43 is generally used for anti-frost control operations and the like.

Figure 8:
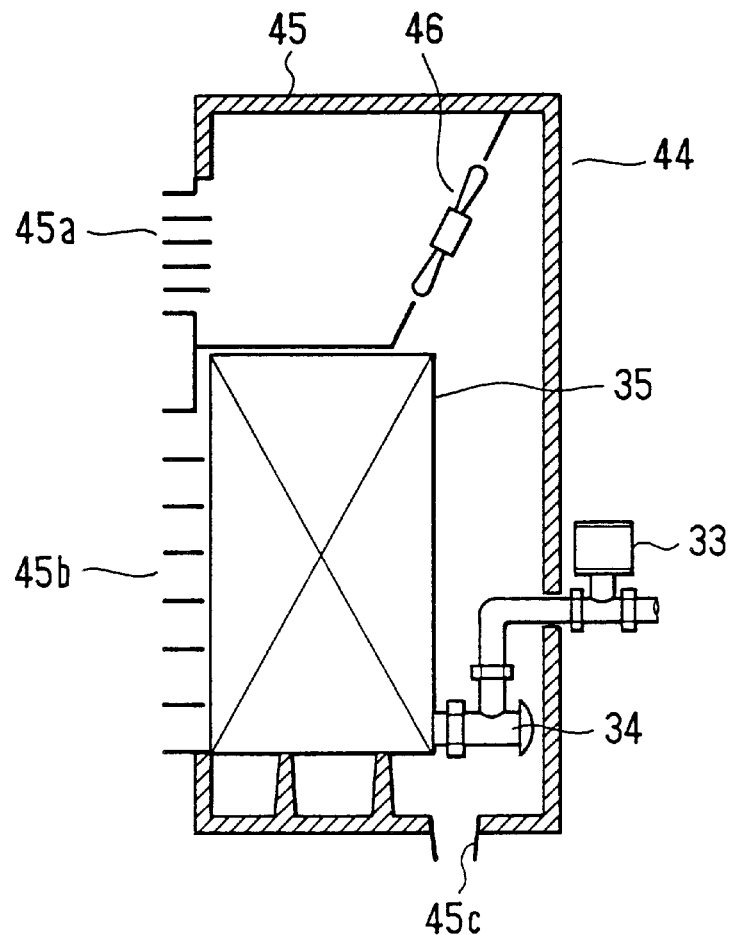
FIG. 8 is a longitudinal cross-section view of a sleeping compartment cooling unit of the air conditioning apparatus of the present invention.

The cooling storage evaporator 35, the constant pressure expansion valve 34 and the check valve 36 of the secondary refrigeration unit 32 are accommodated inside a sleeping compartment air conditioning unit 44 which is disposed in the sleeping compartment 40c. As shown in FIG. 8, the sleeping compartment air conditioning unit 44 has a case 45 that has an upper grilled blower outlet 45 a and a lower air inlet 45b. The cooling storage evaporator 35 and a fan 46 are accommodated within the case 45. The fan 46 is driven by a battery of the truck. The case 45 has a drain outlet 45c from which condensed water flows out.

When the cooling storage packs 38 of the cooling storage evaporator 35 have been cooled and the fan 46 is actuated, air that enters the case 45 via the air inlet 45b passes through the cooling storage evaporator 35 and becomes cold air after being cooled through heat exchange with the cooling storage packs 38. This cold air is blown into the sleeping compartment 40c from the air outlet 45a. Here, as shown in FIG. 6, the secondary refrigeration unit 32 is connected to the compressor 23 and the like via long pipes extending below the cabin 40 with the second solenoid valve 33 being placed immediately before the constant pressure expansion valve 34, that is, the second solenoid valve 33 is placed proximate to the sleeping compartment refrigeration unit 44.

While not shown in the drawings, a controller (that is, an ECU), which includes microprocessors and the like, controls various members of the vehicular air conditioning apparatus which are, namely, the magnet clutch 29 (in effect, the compressor 23 ), the first solenoid valve 30, the second solenoid valve 33, fans 42 and 46 and the like. It must be noted that the first and second solenoid valves 30 and 33 are usually deactuated (closed). These solenoid valves 30 and 33 open when they are actuated.

The controller receives various detection signals such as a pressure signal from the pressure sensor 31 that is indicative of the refrigerant pressure PL, a temperature signal from the cooling storage temperature sensor 39 that is indicative of the detected temperature TS, a temperature signal from the evaporator temperature sensor 43 that is indicative of the temperature Te, and the like. The controller determines that the cooling of the cooling storage packs 38 is complete when the detected temperature Ts of the cooling storage temperature sensor 39 becomes no more than a predetermined temperature (for example, −5° C.).

Figure 9:
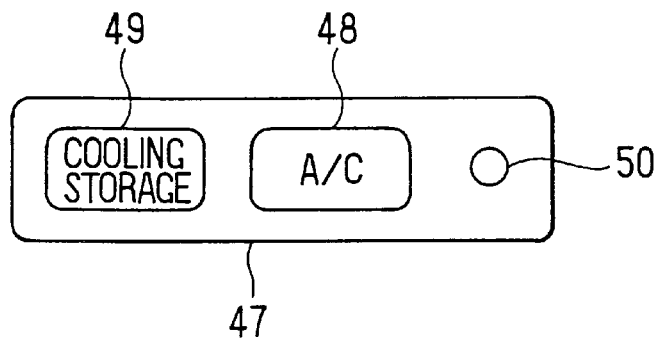
FIG. 9 is a diagram showing cooling storage and air conditioning switches provided in an instrument panel of the truck.

Furthermore, as shown in FIG. 9, a control panel 47 provided inside the driver's compartment 40 a includes an air conditioning switch 48, a cooling storage switch 49, a cooling storage completion lamp 50 and the like. Although not shown in the drawings, the control panel 47 also has a temperature adjustment switch, an air flow volume adjustment switch, an air blow outlet switch, a sleeping compartment air conditioning switch and the like. The controller also receives signals from these switches of control panel 47.

In this way, when the air conditioning switch 48 is actuated, the controller actuates the magnet clutch 29 to activate the compressor 23 and perform air conditioning operations by actuating (that is, opening) the first solenoid valve 30 to supply refrigerant to the main evaporator 28. In addition, when the cooling storage switch 49 is actuated, the controller activates the compressor 23 and performs cooling storage operations by actuating (that is, opening) the second solenoid valve 33 to supply refrigerant to the cooling storage evaporator 35 to cool the cooling storage packs 38.

When both the air conditioning switch 48 and the cooling storage switch 49 are actuated (that is, when performing both the air conditioning and the cooling storage operations), as will be described in detail later, the controller is programmed basically to perform FIR control for alternately actuating the first solenoid valve 30 and the second solenoid valve 33 based on a first time ratio. The first time ratio may be set such that, for example, a first predetermined time period for actuating the first solenoid valve 30 is set to 60 seconds while a second predetermined time period for actuating the second solenoid valve 33 is set to 15 seconds. However, in the present embodiment, when there is an excess in the cooling capacity of the main evaporator 28 as determined from the temperature Te detected by the evaporator temperature sensor 43, the controller performs operations to utilize such excess capacity for performing the cooling storage operations which is actually done by relatively increasing the ratio of the time period the second solenoid valve 33 is actuated with respect to the time period the first solenoid valve 30 is actuated.

When the cooling storage temperature sensor 39 detects that the temperature Ts of the cooling storage packs 38 is, for example, no more than −5° C., the controller determines that the cooling operation on the cooling storage packs 38 is completed and the controller then actuates the cooling storage completion lamp 50. Thereafter, when the sleeping compartment air conditioning switch is actuated, as described above, the controller actuates the fan 46 to supply cold air to the sleeping compartment 40c. In this way, the sleeping compartment 40c can be cooled even if the engine is at a stop.

Here, even after the detection of the completion of cooling storage operations, the controller actuates (opens) the second solenoid valve 33 from time to time to supply refrigerant to the cooling storage evaporator 35 whenever necessary. In this case, if the air conditioning operation is being performed, the controller executes FIR control for alternately actuating the first solenoid valve 30 and the second solenoid valve 33 based on a second time ratio wherein the first time period for actuating the first solenoid valve 30 is extended to, for example, 10 minutes while the second time period for actuating the second solenoid valve 33 is set at 15 seconds.

Furthermore, according to the present embodiment, when at least one of the air conditioning switch 48 and the cooling storage switch 49 is actuated while the ignition switch is being actuated (that is, the engine is in operation), the controller receives the signal indicative of the detected pressure PL from the pressure sensor 31. When the detected pressure PL is less than a predetermined pressure level, the controller actuates the magnet clutch 29 and the second solenoid valve 33 for a predetermined time period (for example, 5–20 seconds) to supply refrigerant to the cooling storage evaporator 35. When the detected pressure PL is still less than the predetermined pressure level after performing this operation, the controller determines that there is a deficiency in the amount of refrigerant and so, the same controller inhibits the actuation of the compressor 23.

Next, the control processes executed by the controller are explained with reference to the flow charts of FIGS. 1–4. But before going into the details of such control processes, inadvertent leakage (that is, bleeding) of refrigerant into the cooling storage evaporator 35 is explained hereinafter.

In the refrigerating cycle 21 wherein the main evaporator 28 and the cooling storage evaporator 35 are provided parallel to each other and refrigerant can be selectively supplied to either evaporator 28, 35, when the cooling storage packs 38 are cooled, the pressure of the cooling storage evaporator 35 declines and thus, there will be a difference between the pressure of the cooling storage evaporator 35 and the main evaporator 28. Such a pressure difference becomes very significant after the completion of cooling operations on the cooling storage packs 38 (whose temperatures will be, for example, in the range of −5 to −10° C.) with the temperature of the compressor 23 and the like being at 50–60° C. due to heat from the engine. Accordingly, even if the second solenoid valve 33 is closed and even with the provision of the check valve 36, the sealing properties of these valves may not be deemed as perfect (that is, no leakage occurs) and thus, some amount of refrigerant may flow into the interior of the cooling storage evaporator 35 and stay inside the same evaporator 35. If such amount of refrigerant leakage into the cooling storage evaporator 35 becomes significant, there might be a shortage in the amount of refrigerant to the main evaporator 28.

The control processes executed by the controller are explained hereinafter. When the ignition switch is being actuated (that is, the engine is in operation), the controller executes the operation shown in the flow chart of FIG. 1 when at least one of the air conditioning switch 48 and the cooling storage switch 49 is being actuated. That is, when the ignition switch is actuated, step 100 determines if at least one of the air conditioning switch 48 and the cooling storage switch 49 is actuated or not. If both switches 48 and 49 are deactuated, step 200 deactuates the magnet clutch 29 (that is, the magnet clutch 29 remains deactuated if it was not actuated previously) to inhibit the operation of the compressor 23.

On the other hand, if step 100 determines that at least one of the air conditioning switch 48 and the cooling storage switch 49 is being actuated, step 300 reads the pressure PL detected by the pressure sensor 31 and determines if the pressure PL is less than a predetermined pressure (for example, 2 kg/cm$^2$). If step 300 determines that the pressure PL is no less than the predetermined pressure, the controller determines that there is no deficiency in the amount of refrigerant in the refrigerating cycle 21 and that the amount of refrigerant in the refrigerating cycle 21 is normal, and thus, control goes to step 400 which actuates the magnet clutch 29 and to step 500 which executes the normal control operations.

On the other hand, if step 300 determines that the detected pressure PL is less than the predetermined pressure, control goes to step 600 which determines if the temperature Ts of the cooling storage packs 38 as detected by the cooling storage temperature sensor 39 is less than, for example, 5° C. If the temperature Ts of the cooling storage packs 38 is less than 5° C., the decrease in the detected pressure PL might be due to the leakage of refrigerant. However, when step 600 gives a negative output, that is the temperature Ts is no less than 5° C., the controller determines that there is a shortage in the amount of refrigerant or there is a malfunction and thus, step 700 deactuates the magnet clutch 29 to inhibit the operation of the compressor 23.

When step 600 gives a positive output, that is, the detected temperature Ts detected by the cooling storage temperature sensor 39 is less than 5° C., step 800 actuates (opens) the second solenoid valve 33 and subsequent step 900 actuates the magnet clutch 29. Accordingly, refrigerant is supplied to the cooling storage evaporator 35 and when there is refrigerant leakage inside the cooling storage evaporator 35, such amount of refrigerant is driven out of the cooling storage evaporator 35. Step 1000 ensures that the refrigerant is supplied to the cooling storage evaporator 35 for a sufficient amount of time (for example, 5–20 seconds) to drive out refrigerant that has accumulated inside the cooling storage evaporator 35.

The execution of the above operations ensures that there is no refrigerant that is left inside the cooling storage evaporator 35. Subsequent step 1100 reads the detected pressure PL of the pressure sensor 31 and determines if the pressure PL is less than the predetermined pressure (for example, 2 kg/cm$^2$) or not. If step 1100 gives a negative output, that is, if step 1100 determines that the pressure PL is no less than the predetermined pressure, the controller determines that there is no deficiency in the amount of refrigerant and that refrigerant that had been remaining in the cooling storage evaporator 35 had been removed and thus, control goes to step 500 which executes normal control operations. On the other hand, if step 1100 gives a positive output, that is, the pressure PL is still less than the predetermined pressure, the controller determines that there is certainly a deficiency in the amount of refrigerant and thus, control goes to step 700 which deactuates the magnet clutch 29 to inhibit the operations of the compressor 23.

With the execution of the above operations, even if there is a large amount of refrigerant remaining inside the cooling storage evaporator 35 when the engine is at a stop, operations of the refrigerating cycle 21 can be started after promptly removing refrigerant that is remaining inside the cooling storage evaporator 35. The predetermined pressure (the pressure level for determining deficiency in the amount of refrigerant) is set to an amount of refrigerant in the storage evaporator 35 that is large enough to adversely affect the air conditioning operations of the air conditioning apparatus. In this regard, it goes without saying that the removal of refrigerant remaining inside the cooling storage evaporator 35 need not be executed when such amount of refrigerant is insignificant.

Next, details of the normal control process of step 500 are explained hereinafter. First, when only the air conditioning switch 48 is actuated and the cooling storage switch 49 is deactuated, the magnet clutch 29 is actuated with the first solenoid valve 30 also being actuated (with the second solenoid valve 33 being deactuated). Accordingly, refrigerant is supplied to the main evaporator 28 to perform the air conditioning operation of the cabin 40. Meanwhile, to prevent the formation of frost, the controller monitors the detected temperature Te of the evaporator temperature sensor 43 and intermittently controls the magnet clutch 29 in such a way that it deactuates the magnet clutch 29 when temperature Te becomes lower than a threshold value (for example, 3° C.).

Meanwhile, when only the cooling storage switch 49 is actuated and the air conditioning switch 48 is deactuated, the magnet clutch 29 is actuated with the second solenoid valve 33 also being actuated (here, the first solenoid valve 30 is deactuated). Accordingly, the controller supplies refrigerant to the cooling storage evaporator 35 to execute the cooling storage operation for cooling the cooling storage packs 38. When the detected temperature Ts of the cooling storage temperature sensor 39 becomes lower than a preset temperature (for example, −5° C.), the controller determines that the cooling storage operation on the cooling storage packs 38 is complete and thus, the controller actuates the cooling storage completion lamp 50. After the completion of the cooling of the storage packs 38, the controller executes a process which is explained later.

Figure 2:
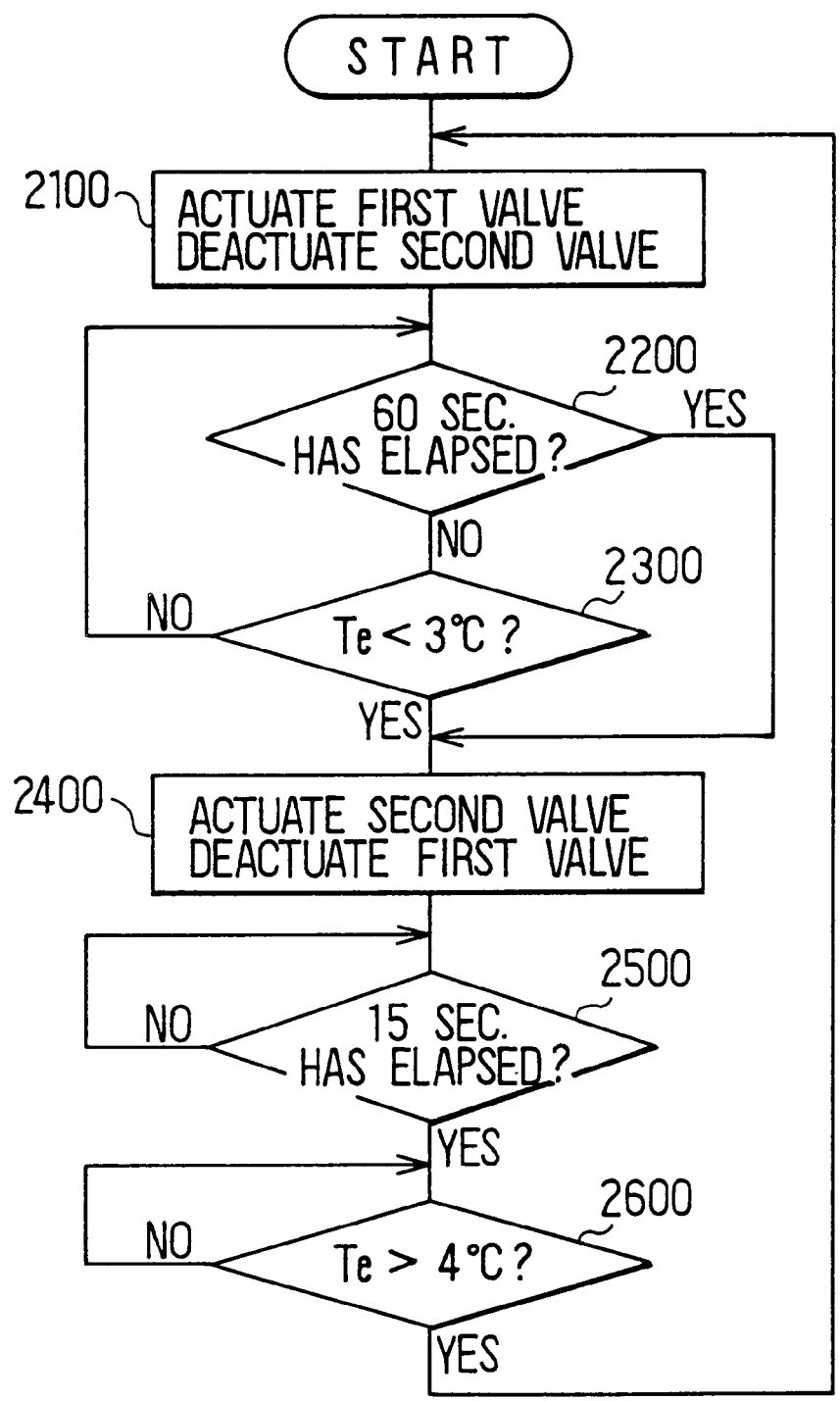
FIG. 2 is a flow chart of a process for controlling solenoid valves of the air conditioning apparatus when both an air conditioning switch and a cooling storage switch are being actuated.

On the other hand, when both the air conditioning switch 48 and the cooling storage switch 49 are actuated, the controller executes the process shown by the flow chart of FIG. 2 until the completion of the cooling storage operation on the cooling storage packs 38. In the process shown in FIG. 2, the controller actuates the magnet clutch 29 and performs FIR control for alternately actuating the first solenoid valve 30 and the second solenoid valve 33 based on a first time ratio (for example, 60 seconds:15 seconds). This FIR control process is executed in consideration of the detected temperature Te of the evaporator temperature sensor 43.

That is, in the control process shown in FIG. 2, step 2100 actuates the first solenoid valve 30 (here, the second solenoid valve 33 is deactuated) to start the supply of refrigerant to the main evaporator 28. Step 2200 ensures that the first solenoid valve 30 is actuated basically for a first predetermined time period which may be set to, for example, 60 seconds. However, if step 2300 determines that the detected temperature Te of the evaporator temperature sensor 43 is less than a first threshold temperature (for example, 3° C.), control goes to step 2400 even if the first predetermined time period has not yet elapsed. Step 2400 deactuates the first solenoid valve 30 to stop the supply of refrigerant to the main evaporator 28 and actuates the second solenoid valve 33 to supply refrigerant to the cooling storage evaporator 35.

While subsequent step 2500 basically ensures that the second solenoid valve 33 is actuated for at least a second predetermined time period (for example, 15 seconds), step 2600 ensures the continued actuation of the second solenoid valve 33 when the detected temperature Te of the evaporator temperature sensor 43 is still no more than a second threshold temperature (for example, 4° C.) even after the second predetermined time period has elapsed. When the second predetermined time period has elapsed after the actuation of the second solenoid valve 33 and the detected temperature Te is more than 4° C., control goes to step 2100 which deactuates the second solenoid valve 33 to stop the supply of refrigerant to the cooling storage evaporator 35 and actuates the first solenoid valve 30 to supply refrigerant to the main evaporator 28.

In this way, with the main evaporator 28 and the cooling storage evaporator 35 being alternately supplied with refrigerant, the air conditioning operation on the cabin 40 can be performed while executing the cooling storage operation on the cooling storage pack 38. When the detected temperature Te of the evaporator temperature sensor 43 falls below the first threshold temperature while the first solenoid valve 30 is being actuated, the air conditioning apparatus according to the present embodiment channels its cooling capacity towards the cooling storage evaporator 35. In this way, the actuation time of the second solenoid valve 33 can be relatively increased with respect to the actuation time of the first solenoid valve 30.

In addition, if the detected temperature Te of the evaporator temperature sensor 43 remains lower than the second threshold temperature while the second solenoid valve 33 is being actuated (in other words, the temperature of the main evaporator 28 is still sufficiently low and there is still no need to supply refrigerant to the main evaporator 28 ), the cooling storage operation of the cooling storage evaporator 35 on the cooling storage packs 38 is continued. In this way, the actuation time of the second solenoid valve 33 can be relatively increased with respect to the actuation time of the first solenoid valve 30 and thus, time needed for completing the cooling storage operation of the cooling storage packs 38 can be shortened.

Figure 3:
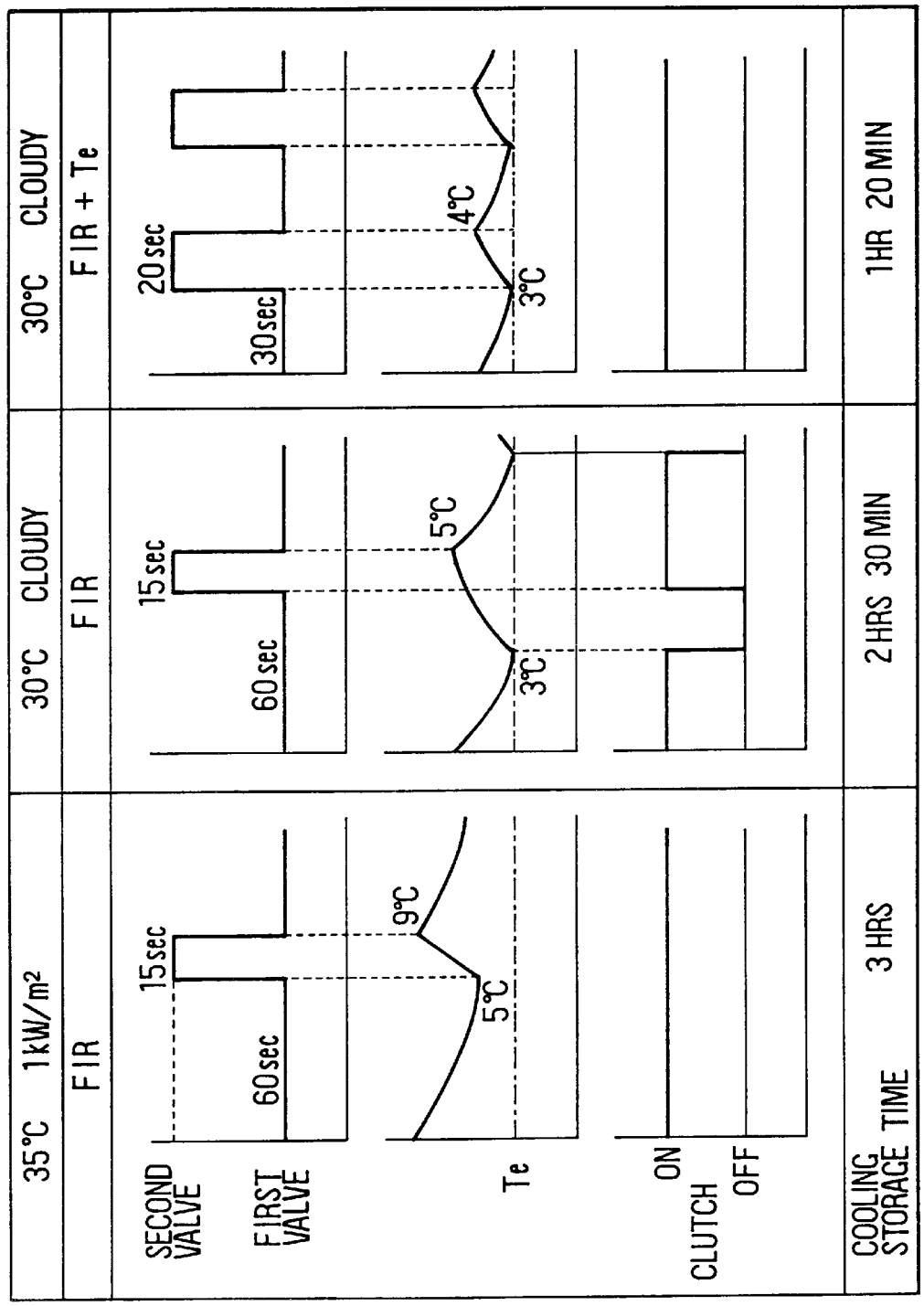
FIG. 3 shows a comparison of control processes for controlling the solenoid valves of the air conditioning apparatus.

FIG. 3 shows a comparison of control procedures and time needed for completing the cooling storage operation when performing only FIR control (indicated by the left and center columns of the same figure) and when performing the control procedure of the present embodiment with consideration of the temperature Te (indicated by the right column of the same figure). As shown in the left column of FIG. 3, when only FIR control is executed with temperature outside of the vehicle at 35° C. and the amount of solar irradiance at 1 kW/m², the magnet clutch 29 is actuated continuously and the cooling storage operation of the cooling storage packs 38 is completed in approximately 3 hours. On the other hand, as shown in the center column of FIG. 3, when the outside temperature is 30° C. and the weather is cloudy, the detected temperature Te of the evaporator temperature sensor 43 goes below 3° C. during the actuation period (60 seconds) of the first solenoid valve 30 and thus, there will be a need to deactuate the magnet clutch 29 to prevent the formation of frost. In this case, the cooling storage operation of the cooling storage packs 38 is completed in approximately 2.5 hours.

Meanwhile, with the performance of FIR control while considering the detected temperature Te, as shown in the right column of FIG. 3, the magnet clutch 29 is continuously actuated and the temperature around the main evaporator 28 (that is the detected temperature Te) is kept approximately between 3° C. and 4° C. while setting the actuation times of the first solenoid valve 30 and the second solenoid valve 33 to, for example, 30 seconds and 20 seconds, respectively. In this way, the time needed for completing the cooling storage operation of the cooling storage packs 38 can be shortened to, for example, 1 hour and 20 minutes.

Figure 4:
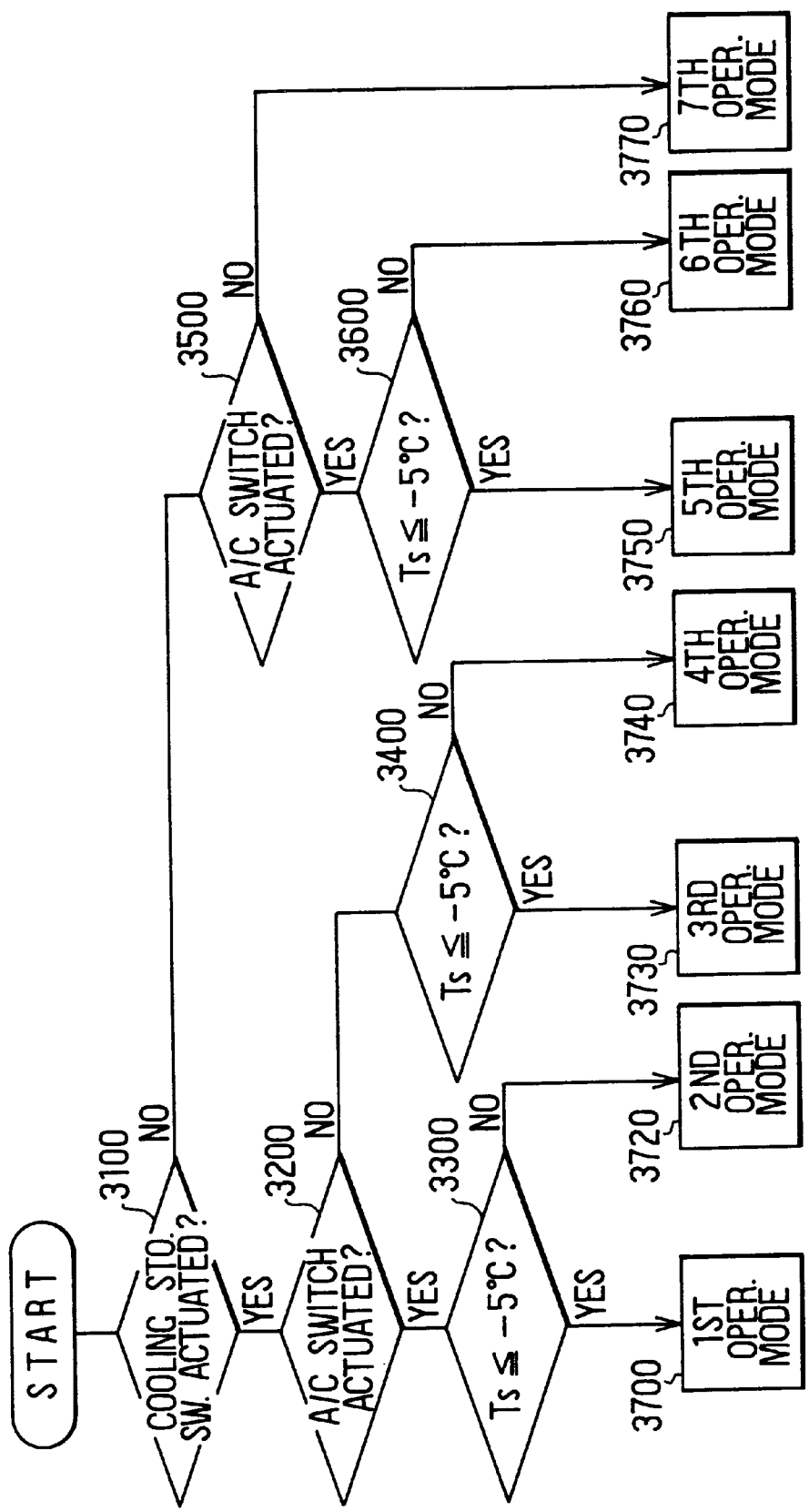
FIG. 4 is a flowchart of a process for controlling the solenoid valves after the completion of a cooling storage process.

Meanwhile, after the completion of the cooling storage operation of the cooling storage packs 38, the controller executes the process shown in FIG. 4 and TABLE 1. Here, when at least one of the air conditioning switch 48 and the cooling storage switch 49 is being actuated (in other words, the refrigerating cycle 21 is being actuated), refrigerant is supplied to the cooling storage evaporator 35 even after the completion of the cooling storage operation to prevent refrigerant from leaking to and staying inside the cooling storage evaporator 35.

TABLE 1

| OPERATING MODE | 1ST | 2ND | 3RD | 4TH | 5TH | 6TH | 7TH |
|---|---|---|---|---|---|---|---|
| AIR COND. OPER. OR COOLING STO. OPERATION? | BOTH OPERATIONS ALTERNATELY EXECUTED | | COOLING STORAGE OPERATION ONLY | | AIR CONDITIONING OPERATION ONLY | | NO OPERATIONS EXECUTED |
| COOLING STO. OPER. COMPLETE? | YES | NO | YES | NO | YES | NO | |
| FIRST SOLENOID VALVE | FIR CONTROL 10 MIN: | FIR + Te 60 SEC: | CLOSED | CLOSED | FIR CONTROL 10 MIN: | OPEN | CLOSED |
| SECOND SOLENOID VALVE | 15 SEC | 15 SEC | CLOSED | OPEN | 15 SEC | CLOSED | CLOSED |
| MAGNET CLUTCH | ON | ON | OFF | ON | ON | ON | OFF |

That is, according to the process shown in FIG. 4, when step 3100 determines that the cooling storage switch 49 is being actuated and step 3200 determines that the air conditioning switch 48 is being actuated, control goes to step 3300 which determines if the temperature Ts of the cooling storage packs 38 as detected by the cooling storage temperature sensor 39 is no more than −5° C. or not. If step 3300 determines that the detected temperature Ts is no more than −5° C., step 3700 sets the first operating mode. As shown in TABLE 1, in the first operating mode, because the cooling storage packs 38 are still sufficiently cold, the controller actuates the magnet clutch 29 together with executing FIR control to alternately actuate the first solenoid valve 30 and the second solenoid valve 33 based on the second time ratio (for example, the first solenoid valve 30 is actuated for 10 minutes while the second solenoid valve 33 is actuated for 15 seconds).

Accordingly, even if there is refrigerant remaining in the cooling storage evaporator 35, refrigerant is supplied to the cooling storage evaporator 35 to promptly drive out the remaining refrigerant inside it before such amount of remaining refrigerant gets any larger to adversely affect the air conditioning operations.

On the other hand, if step 3300 determines that the detected temperature Ts is more than −5° C., the temperature of the cooling storage packs 38 is considered to have risen to a level that they cannot be considered sufficiently cold enough (that is, the cooling storage operation on the cooling storage packs 38 cannot be considered as complete), and thus, control goes to step 3720 which sets a second operating mode that is shown in detail in TABLE 1. In this second operating mode, the controller performs a FIR control process, which takes the temperature Te into consideration, on the first solenoid valve 30 and the second solenoid valve 33.

Meanwhile, when step 3100 determines that the cooling storage switch 49 is actuated and step 3200 determines that the air conditioning switch 48 is deactuated, control goes to step 3400 which determines if the temperature Ts of the cooling storage packs 38 as detected by the cooling storage temperature sensor 39 is no more than −5° C. or not. If step 3400 determines that the temperature Ts is no more than −5° C., the controller determines that there is no need to supply refrigerant to the main and secondary refrigeration units 26 and 32 and thus, step 3730 sets a third operating mode. In this third operating mode, the controller deactuates the magnet clutch 29 together with deactuating the first solenoid valve 30 and the second solenoid valve 33. On the other hand, when the temperature Ts is greater than −5° C., that is, when step 3400 gives a negative output, control goes to step 3740 which sets a fourth operating mode. In this fourth operating mode, the controller actuates the magnet clutch 29 together with actuating the second solenoid valve 33 to supply refrigerant to the cooling storage evaporator 35 to perform the cooling storage operation of the cooling storage packs 38.

Meanwhile, when step 3100 determines that the cooling storage switch 49 is deactuated and step 3500 determines that the air conditioning switch 48 is being actuated, control goes to step 3600 which determines if the detected temperature Ts of the cooling storage sensor 39 is no more than −5° C. or not. When the temperature Ts is no more than −5° C., that is, when step 3600 gives a positive output, the cooling storage operation is considered to be complete and the cooling storage packs 38 are considered to be sufficiently cold, and thus, control goes to step 3750 which sets a fifth operating mode. In this fifth operating mode, the controller performs FIR control to alternately actuate the first solenoid valve 30 and the second solenoid valve 33 based on the second predetermined time ratio. In this second predetermined time ratio, for example, the first solenoid valve 30 is actuated for 10 minutes while the second solenoid valve 33 is actuated for 15 seconds. Accordingly, even if there is refrigerant remaining in the cooling storage evaporator 35, refrigerant is supplied to the cooling storage evaporator 35 to promptly drive out the remaining refrigerant inside it before such amount of remaining refrigerant gets any larger.

On the other hand, if the temperature Ts is more than −5° C., that is, step 3600 gives a negative output and control goes to step 3760 which sets a sixth operating mode. In this sixth operating mode, because the controller considers that there is minimal probability that there is refrigerant remaining inside the cooling storage evaporator 35 and that the user does not intend to perform the cooling storage operation, the controller actuates only the first solenoid valve 30 to perform the air conditioning operation. When both cooling storage switch 49 and the air conditioning switch 48 are both deactuated, that is, step 3100 determines that the cooling storage switch 49 is deactuated and step 3500 determines that the air conditioning switch 48 is deactuated, control goes to step 3770 which sets a seventh operating mode. In this operating mode, the controller deactuates the refrigerating cycle 21 by deactuating the first and second solenoid valves 30 and 33.

Meanwhile, the proper amount of refrigerant circulating in the refrigerating cycle 21 is different when refrigerant is flowing through the main refrigeration unit 26 (that is, flowing through the main evaporator 28 ) and when refrigerant is flowing through the secondary refrigeration unit 32 (that is, flowing through the cooling storage evaporator 35 ). Furthermore, when supplying a constant amount of refrigerant to the cooling storage evaporator 35 at the start of the cooling storage operation of the cooling storage packs 38, there will be a significant difference between the temperature of the cooling storage packs 38 and the temperature of the refrigerant and thus, the amount of heat that the refrigerant takes away from the cooling storage packs 38 will also be significant. Accordingly, refrigerant vaporizes at the outlet side of the cooling storage evaporator 35. However, at the later stages of the cooling storage operation, the amount of heat the refrigerant takes away from the cooling storage packs 38 decreases and thus, the refrigerant remains in a liquid state at the outlet side of the cooling storage evaporator 35. In this way, the proper amount of refrigerant to be circulated in the secondary refrigeration unit 32 is significantly influenced by the temperature of the cooling storage packs 38.

Here, as shown in FIG. 6, because the refrigerant fluid line of the secondary refrigeration unit 32 can extend from the branch point A up to the sleeping compartment air conditioning unit 44 (the length of the fluid line being, for example, 4 meters), the proper amount of refrigerant in the refrigerating cycle 21 when refrigerant is flowing in the main refrigeration unit 26 (the main evaporator 28) changes in accordance with the position of the second solenoid valve 33. In the present embodiment, the second solenoid valve 33 is placed immediately before the constant pressure expansion valve 34 and thus, the length of the refrigerant line that extends from the branch point A to the second solenoid valve 33 can be elongated. In this way, compared to the case when the second solenoid valve 33 is placed immediately after the branch point A, the capacity of the refrigerating cycle 21 according to the present embodiment is greater by approximately 110 cc (that is, assuming that the internal diameter of the fluid line is 6 mm).

Accordingly, fluctuations in the amount of refrigerant circulating between the main refrigeration unit 26 and the secondary refrigeration unit 32 can be reduced to a minimum. Moreover, while fluctuations in the proper amount of refrigerant can be dealt with by increasing the capacity of the receiver 25 or by adding a buffer receiver, in combination with the present invention, increase in the capacity of the receiver 25 can be reduced to a minimum and the minimum required capacity for the buffer receiver can be set to a minimum.

According to the present embodiment, even if refrigerant remains inside the cooling storage evaporator 35 at the completion of the cooling storage operation on the cooling storage packs 38, with the process of FIG. 4, such residual refrigerant is driven out promptly from the cooling storage evaporator 35 with the immediate supply of refrigerant. In this way, refrigerant remaining inside the cooling storage evaporator 35 is driven out before the amount of such refrigerant becomes significant. Thus, the stay of refrigerant inside the cooling storage evaporator 35 can be prevented and thus, ensure sufficient cooling capacity during air conditioning operations.

Figure 1:
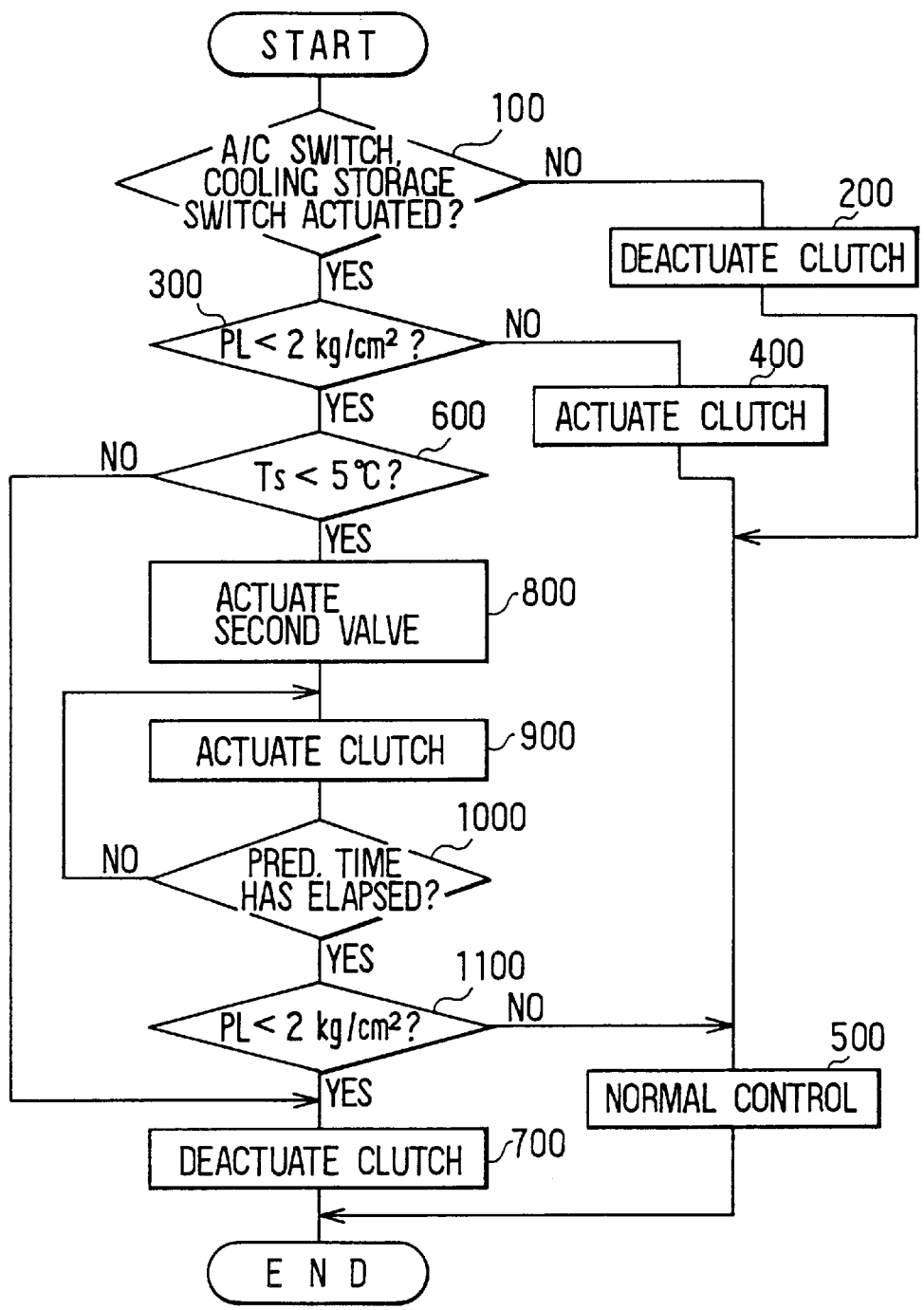
FIG. 1 is a flow chart of a process for determining shortage of refrigerant in a refrigerating cycle of an air conditioning apparatus according to a first embodiment of the present invention.

Moreover, in the present embodiment, as shown in FIG. 1, because refrigerant is supplied to the cooling storage evaporator 35 for a predetermined amount of time when the pressure PL detected by the pressure sensor 31 (which is provided for detecting shortage of refrigerant) is less than the predetermined pressure level during the actuation of the engine, decline in the refrigerant pressure due to refrigerant remaining inside the cooling storage evaporator 38 during the stoppage of the engine can be driven out to start the operation of the refrigerating cycle 21. In this way, erroneous detection of the shortage of refrigerant can be prevented beforehand.

Furthermore, in the present embodiment, when the air conditioning switch 48 and the cooling storage switch 49 are both actuated (considering that the cooling storage operation is not yet complete), as shown in FIGS. 2 and 3, the control of the first solenoid valve 30 and the second solenoid valve 33, that is, the control and switching of the supply of refrigerant to the main evaporator 28 and the cooling storage evaporator 35 are basically performed based on a time-based control procedure (FIR control). In addition to this, in the present embodiment, when the main evaporator 28 has an excess in its capacity as determined based on the detected temperature Te of the evaporator temperature sensor 43, such excess in capacity is used for the cooling storage operation of the cooling storage evaporator 35 on the cooling storage packs 38. In this way, the time needed for completing the cooling storage operation is shortened. Accordingly, compared with only performing FIR control, the present embodiment enables the shortening of the time needed for completing the cooling storage operation. Also, while the temperature Te detected by the evaporator temperature sensor 43 is used in the control process performed in the present embodiment, such sensor 43 is usually provided for anti-frost operations and thus, there will be no need to provide additional parts and there will be no increase in costs when performing the FIR control procedure of the present embodiment that takes the temperature Te into consideration.

Figure 10:
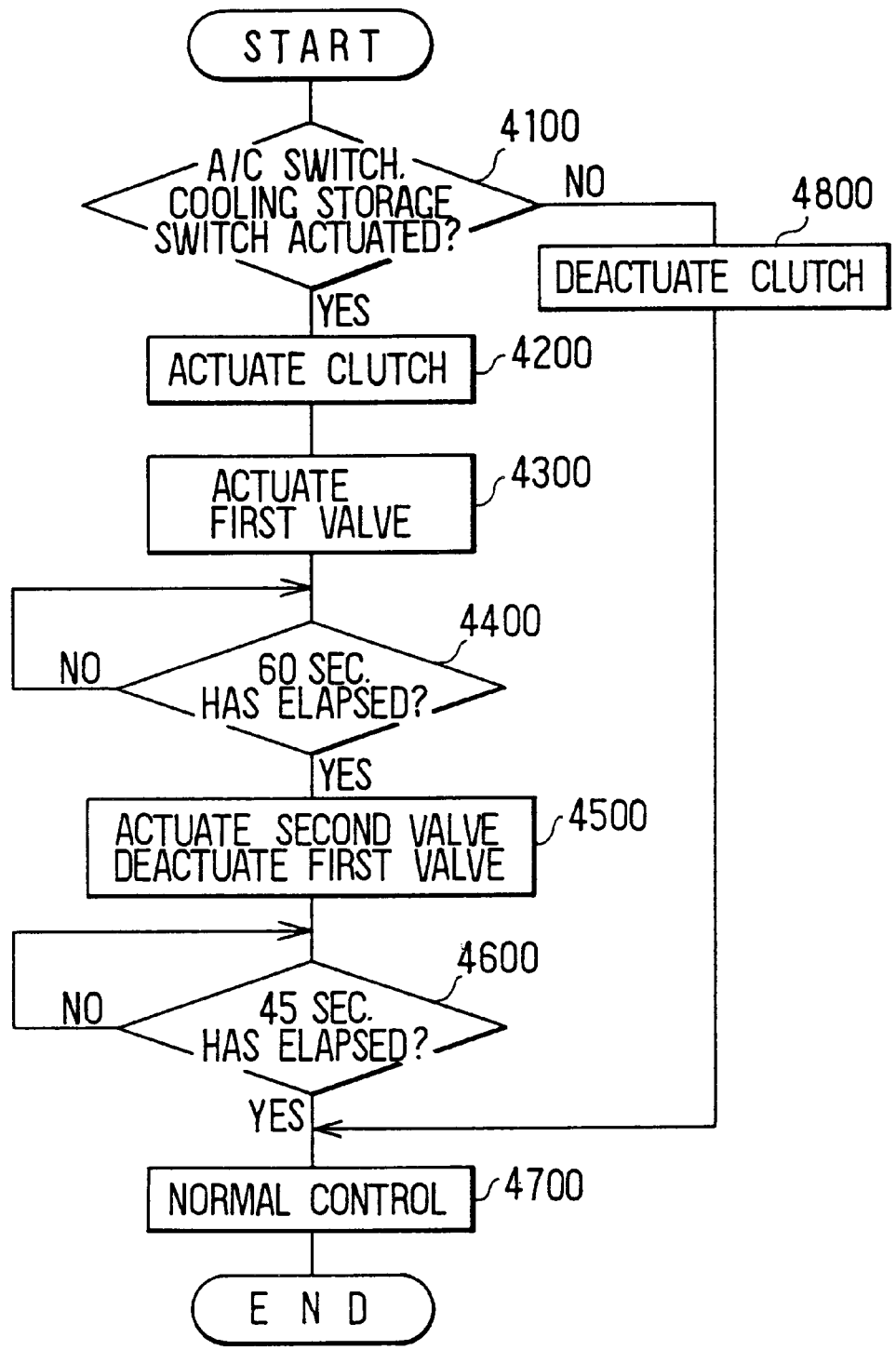
FIG. 10 is a flow chart of the process for determining shortage of refrigerant in the refrigerating cycle of the air conditioning apparatus according to a second embodiment of the present invention.
Figure 11:
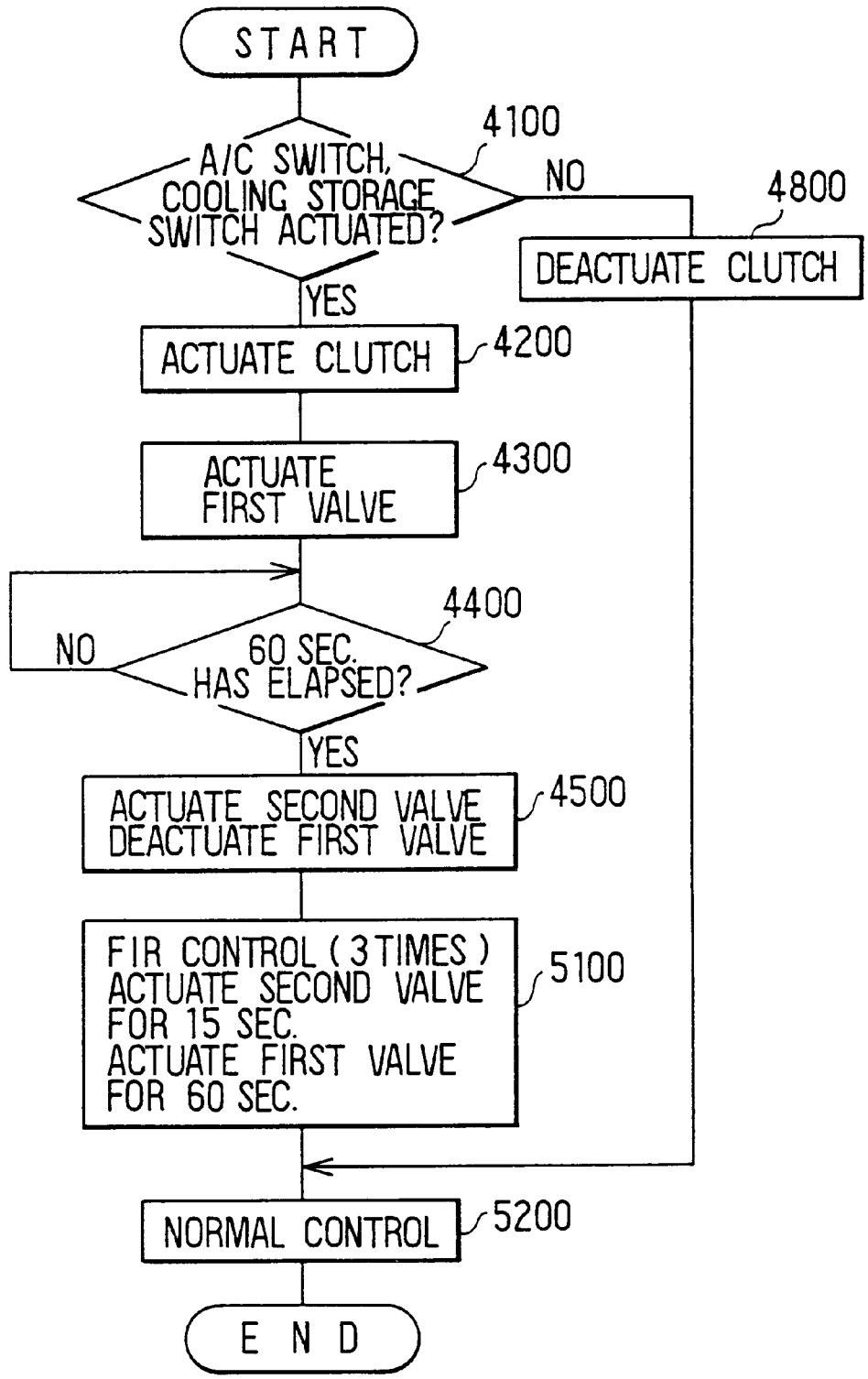
FIG. 11 is a flow chart of the process for determining shortage of refrigerant in the refrigerating cycle of the air conditioning apparatus according to a third embodiment of the present invention.
Figure 12:
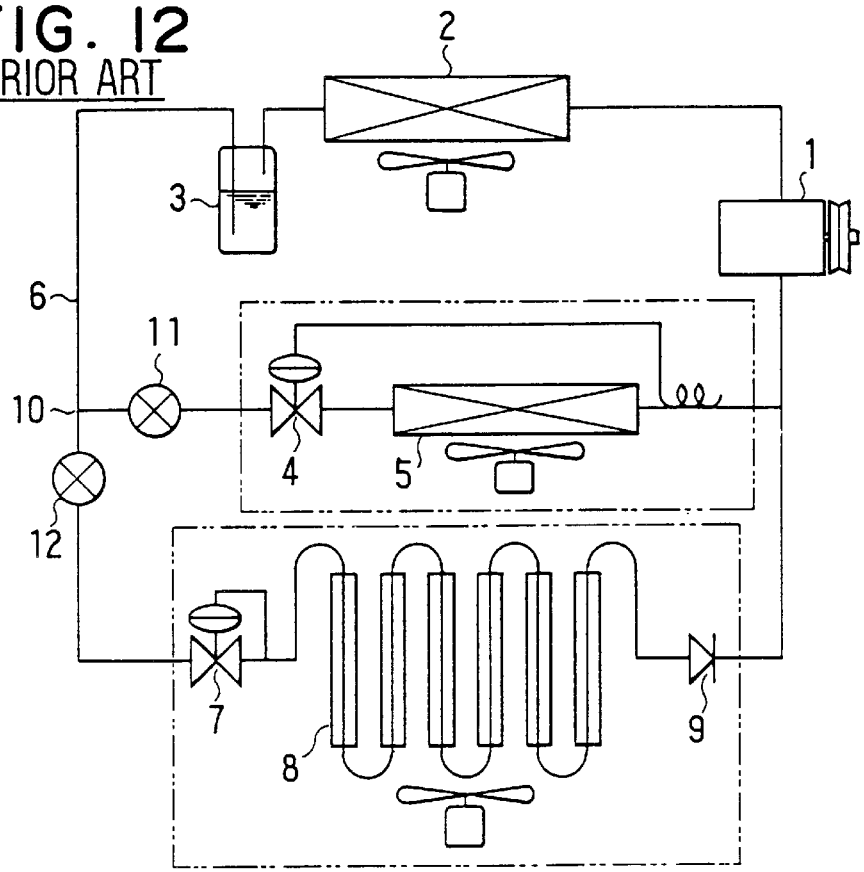
FIG. 12 is a diagram showing the construction of a refrigerating cycle of a conventional air conditioning apparatus.
Figure 13:
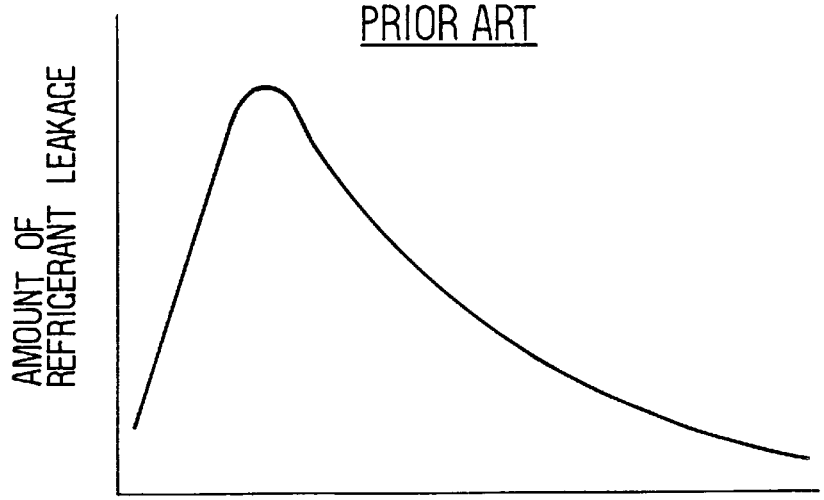
FIG. 13 is a graph showing the relationship between amount of refrigerant leakage to a cooling storage evaporator and pressure difference around a check valve coupled to the cooling storage evaporator in a conventional air conditioning apparatus.

FIGS. 10 and 11 show respective control processes according to second and third embodiments of the present invention. The heat capacity of the cooling storage packs 38 is very large even when the cooling storage operation is not being performed. Thus, when there is a significant change in temperatures outside the vehicle, the change in temperatures of the cooling storage packs 38 will be delayed compared to the change in the outside temperature. In this way, a pressure difference builds up around the check valve 36 which may lead to the leakage of refrigerant to the cooling storage evaporator 35. In addition, while refrigeration machine oil (that is, compressor oil) circulates inside the refrigerating cycle 21 together with the refrigerant, if part of such refrigerant machine oil remains in the cooling storage evaporator 35, there will be a shortage of refrigerating machine oil in the compressor 23 which brings about problems such as the shortening of the usage lifetime of the compressor 23 and the like.

In view of the above problems, at the start of the air conditioning operations, regardless of the detected refrigerant pressure PL, it may be desirable to supply refrigerant to the cooling storage evaporator 35 to prevent the stay of the refrigerant inside the cooling storage evaporator 35. However, if such operation is performed when there is no refrigerant remaining in the cooling storage evaporator 35, there will be no refrigerant flowing from the cooling storage evaporator 35 to the compressor 23. At the same time, because of the reduced amount of refrigerant circulating in the cooling storage evaporator 35 due to the large heat load of the cooling storage packs 38, refrigeration machine oil may remain in the cooling storage evaporator 35 and may not return to the compressor 23 and thus, the compressor 23 might be adversely affected.

In this way, in the second embodiment as shown in FIG. 10, at the start of the air conditioning operations for the cabin 40, regardless of the pressure PL detected by the pressure sensor 31, refrigerant is continuously supplied to the main evaporator 28 for a predetermined time period starting from the commencement of air conditioning operations and thereafter, refrigerant is supplied for a predetermined period of time to the cooling storage evaporator 35 to remove any remaining refrigerant in the cooling storage evaporator 35.

That is, in the flow chart of FIG. 10, when step 4100 detects that at least one of the air conditioning switch 48 and the cooling storage switch 49 is being actuated (that is, step 4100 gives a positive output), control goes to step 4200 which actuates the magnet clutch 29 and then to step 4300 which actuates the first solenoid valve 30. Step 4400 ensures that the first solenoid valve 30 is actuated for a predetermined period of time, for example, 60 seconds. With this operation, refrigerant is supplied to the main evaporator 28 and refrigerant and refrigerating machine oil remaining inside the main evaporator 28 flows to the compressor 23 and thus, there will be no shortage of refrigerating machine oil in the compressor 23.

When step 4400 determines that refrigerant has been supplied to the main evaporator 28 for 60 seconds (that is, step 4400 gives a positive output), control goes to step 4500 which deactuates the first solenoid valve 30 and actuates the second solenoid valve 33. With this process, refrigerant is supplied to the cooling storage evaporator 35 and if there is some refrigerant remaining in the cooling storage evaporator 35, such refrigerant will be driven out. Step 4600 ensures that this driving out of the refrigerant for solving the problem of refrigerant remaining inside the cooling storage evaporator 35 is executed for a predetermined time period, for example, 45 seconds.

At this time, even if there had been no refrigerant remaining in the cooling storage evaporator, there will be no damage to the compressor 23 due to the lack of the refrigerating machine oil because a sufficient amount of refrigerant had been supplied to the compressor 23. When 45 seconds has elapsed (that is, step 4600 gives a positive output), control goes to subsequent step 4700 which performs the normal control procedure discussed before in the first embodiment.

Meanwhile, when step 4100 determines that the air conditioning switch 48 and the cooling storage switch 49 are both deactuated, control goes to step 4800 which deactuates the magnet clutch 29 to deactuate the compressor 23. The above predetermined time periods of 45 and 60 seconds set for steps 4400 and 4600, respectively, can be appropriately set in accordance with actual application conditions.

Meanwhile, in a third embodiment of the present invention whose control procedure is shown in FIG. 11, at the start of the air conditioning operation for the cabin 40 and regardless of the pressure PL detected by the pressure sensor 31, refrigerant is supplied to the main evaporator 28 for a predetermined time period from the start of the air conditioning operation in the same way as the process shown in FIG. 1. Thereafter, refrigerant is alternately supplied to the main evaporator 28 and the cooling storage evaporator 35 for a predetermined number of times based on a preset time ratio.

That is, in the process shown by the flow chart of FIG. 11, when step 4400 gives a positive output after supplying refrigerant to the main evaporator 28 for 60 seconds, control goes to step 4500 which deactuates the first solenoid valve 30 and deactuates the second solenoid valve 33. Control then goes to subsequent step 5100 which performs FIR control for a predetermined number of times (for example, 3 times) to alternately actuate the second solenoid valve 33 for, e.g., 15 seconds and the first solenoid valve 30 for, e.g., 60 seconds. Thereafter, control goes to step 5200 which executes the normal control procedure similar to those of the first embodiment described before. It must be noted that the predetermined number of times (which is set to 3 times here) for executing FIR control and the predetermined time ratio (which is 60 seconds:15 seconds here) may be set in accordance with actual application conditions.

Thus, in the same way as the second embodiment whose control process is shown in FIG. 10, the present embodiment removes refrigerant remaining in the cooling storage evaporator 35 after remedying the shortage of refrigerating machine oil in the compressor 23. In this way, the refrigerant remaining inside the cooling storage evaporator 35 is removed while protecting the compressor 23 and preventing probable damage in the same compressor 23. Also, because the present embodiment performs FIR control in step 5100, decline in the air conditioning capacity of the main evaporator 28 can also be prevented.

Although the present invention has been fully described in connection with preferred embodiments thereof with reference to the accompanying drawings, it is to be noted that various changes and modifications will become apparent to those skilled in the art.

For example, while the control process shown in FIGS. 1 and the like is executed at the actuation of the ignition switch (that is, the actuation of the engine), to immediately and forcefully cool the cabin 40 during summer and the like (that is, to perform cooling down of the cabin 40) after the actuation of the engine, a control process which supplies refrigerant to the main evaporator 28 (the primary evaporator) for a predetermined period of time (for example, 10–20 minutes) after the commencement of air conditioning operations may also be executed.

In this control process, to execute the cooling down of the cabin 40 while also considering any decline in the detected pressure PL of the pressure sensor 31, refrigerant may be supplied first to the cooling storage evaporator 35 (the secondary evaporator) for a predetermined period of time with the main evaporator 28 being supplied with refrigerant thereafter for a preset amount of time. In this way, cooling down of the cabin 40 is performed while preventing shortage of refrigerant during the operation of the refrigerating cycle 21.

While FIR control in consideration of the detected temperature Te is performed in the previous embodiments, FIR control (time control) may be performed also without considering such detected evaporator temperature Te. In this case, the time ratio for performing FIR control may be set in accordance with actual usage conditions and the like. For example, the time ratio may be set in accordance with changes in the cabin temperature, the cooling storage condition and the like. Furthermore, while two solenoid valves, namely, the first solenoid valve 30 and the second solenoid valve 33, are used in the foregoing embodiments, a single solenoid valve may be used instead to switch the flow of refrigerant.

Meanwhile, while the secondary evaporator 35 (that is, the cooling storage evaporator) is being used here for cooling the cooling storage packs 38, the secondary evaporator 35 may also be used for cooling a refrigerator and the like. Moreover, aside from trucks, the present invention may also be applied to other types of vehicles.

Such changes and modifications are to be understood as being within the scope of the present invention as defined by the appended claims.

What is claimed is:

1. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target;

a first switch which actuates said first evaporator unit; and a second switch which actuates said second evaporator unit, wherein:

said refrigerant supply control means alternately supplies refrigerant to said first evaporator unit and said second evaporator unit based on a predetermined first time ratio when both of said first switch and said second switch are being actuated and unless said cooling operation completion determination means determines that said second evaporator unit has completed cooling said cooling target;

said first ratio indicates a first time period for supplying refrigerant to said first evaporator unit and a second time period for supplying refrigerant to said second evaporator unit;

said refrigerant supply control means alternately supplies refrigerant to said first evaporator unit and said second evaporator unit based on a predetermined second time ratio after said cooling operation completion determination means determines that said second evaporator unit has completed cooling said cooling target; and said second time ratio indicates a third time period for supplying refrigerant to said first evaporator unit and a fourth time period for supplying refrigerant to said second evaporator unit, a ratio of said third time period with said fourth time period being greater than a ratio of said first time period with said second time period in said first time ratio, said second time ratio being used to relatively decrease refrigerant flow to said second evaporator.

2. A vehicular air conditioning apparatus according to claim 1, wherein:

said cooling operation completion determination means includes a temperature sensor that can detect the temperature of said cooling target, and said cooling operation completion determination means determines that said second evaporator unit has completed cooling said cooling target when said temperature of said cooling target is no more than a predetermined temperature.

3. A vehicular air conditioning apparatus according to claim 1, wherein said third time period of said second time ratio is longer than said first time period of said first time ratio.

4. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target;

a first switch which actuates said first evaporator unit;

a second switch which actuates said second evaporator unit; and an evaporator temperature sensor for detecting an evaporator temperature around said first evaporator unit, wherein:

when both said first switch and said second switch are being actuated, said refrigerant supply control means supplies refrigerant to said first evaporator unit for a predetermined first supply time interval, said refrigerant supply control means terminating supply of refrigerant to said first evaporator unit and supplying refrigerant to said second evaporator unit after said first supply time interval elapses, when both said first switch and said second switch are being actuated, said refrigerant supply control means terminates supply of refrigerant to said first evaporator unit and supplies refrigerant to said second evaporator unit when said evaporator temperature detected by said evaporator temperature sensor is no more than a first threshold temperature, and when both said first switch and said second switch are being actuated, said refrigerant supply control means supplies refrigerant to said second evaporator unit for a predetermined second supply time interval, said refrigerant supply control means terminating supply of refrigerant to said second evaporator unit and supplying refrigerant to said first evaporator unit after said second supply time interval elapses and when said evaporator temperature detected by said evaporator temperature sensor exceeds a second threshold temperature.

5. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target; and a first switch which actuates said first evaporator unit, wherein said refrigerant supply control means supplies refrigerant to said first evaporator unit for a predetermined cooling time period after the actuation of said first switch.

6. A vehicular air conditioning apparatus for use in a vehicle, said apparatus comprsing:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target;

a first switch which actuates said first evaporator unit;

a second switch which actuates said second evaporator unit;

a fluid line provided in said refrigerating cycle; and a pressure sensor which detects refrigerant pressure of refrigerant in said fluid line, wherein:

when at least one of said first switch and said second switch is being actuated, said refrigerant supply control means supplies refrigerant to said second evaporator unit for a first prescribed time period when said refrigerant pressure detected by said pressure sensor is less than a predetermined pressure level.

7. A vehicular air conditioning apparatus according to claim 6, wherein when said first switch is actuated and said refrigerant pressure detected by said pressure sensor is less than said predetermined pressure level, said refrigerant supply control means supplies refrigerant to said second evaporator unit for said first prescribed time period and supplies refrigerant to said first evaporator unit for a second prescribed time period after said first prescribed time period elapses.

8. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target; and a first switch which actuates said first evaporator unit, wherein when said first switch is actuated, said refrigerant supply control means supplies refrigerant to said first evaporator unit for a first preset time period after the actuation of said first switch and supplies refrigerant to said second evaporator unit for a second preset time period after the elapse of said first preset time period.

9. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target; and a first switch which actuates said first evaporator unit, wherein:

when said first switch is actuated, said refrigerant supply control means supplies refrigerant to said first evaporator unit for a first preset time period after the actuation of said first switch, and after the elapse of said first preset time period, said refrigerant supply control means supplies refrigerant alternately to said first evaporator unit and said second evaporator unit based on a preset time ratio for a predetermined number of times.

10. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target; and temperature detecting means for detecting the temperature of the second evaporator unit, wherein an amount of the selectively supplied refrigerant is increased when temperature detected by the temperature detecting means exceeds a predetermined temperature after the cooling operation completion determination means determines that the cooling operation has been completed.

11. A vehicular air conditioning apparatus according to claim 10, said apparatus further comprising:

a first switch which actuates said first evaporator unit; and a second switch which actuates said second evaporator unit, wherein:

said refrigerant supply control means alternately supplies refrigerant to said first evaporator unit and said second evaporator unit based on a predetermined first time ratio when both of said first switch and said second switch are being actuated and unless said cooling operation completion determination means determines that said second evaporator unit has completed cooling said cooling target;

said first time ratio indicates a first time period for supplying refrigerant to said first evaporator unit and a second time period for supplying refrigerant to said second evaporator unit;

said refrigerant supply control means alternately supplies refrigerant to said first evaporator unit and said second evaporator unit based on a predetermined second time ratio after said cooling operation completion determination means determines that said second evaporator unit has completed cooling said cooling target;

said second time ratio indicates a third time period for supplying refrigerant to said first evaporator unit and a fourth time period for supplying refrigerant to said second evaporator unit, a ratio of said third time period with said fourth time period being greater than a ratio of said first time period with said second time period in said first time ratio, said second time ratio being used to relatively decrease refrigerant flow to said second evaporator;

said refrigerant supply control means alternately supplies refrigerant to said first evaporator unit and said second evaporator unit based on a predetermined third time ratio after said second evaporator unit has completed cooling said cooling target and said cooling target subsequently rises in temperature a predetermined amount; and said third time ratio indicates a fifth time period for supplying refrigerant to said first evaporator unit and a sixth time period for supplying refrigerant to said second evaporator unit, a ratio of said fifth time period with said sixth time period being greater than said ratio of said first time period with said second time period and smaller than said ratio of said third time period with said fourth time period, said third time ratio being used to increase refrigerant flow to said second evaporator over said refrigerant flow to said second evaporator during said second time ratio.

12. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying refrigerant to said second evaporator unit even after said cooling operation completion determination means determines that said second evaporator unit has completed cooling said cooling target;

a first switch which actuates said first evaporator unit; and a second switch which actuates said second evaporator unit, wherein:

said refrigerant supply control means alternately supplies refrigerant to said first evaporator unit and said second evaporator unit based on a predetermined first time ratio when both of said first switch and said second switch are being actuated and unless said cooling operation completion determination means determines that said second evaporator unit has completed cooling said cooling target;

said first time ratio indicates a first time period for supplying refrigerant to said first evaporator unit and a second time period for supplying refrigerant to said second evaporator unit;

said refrigerant supply control means alternately supplies refrigerant to said first evaporator unit and said second evaporator unit based on a predetermined second time ratio after said cooling operation completion determination means determines that said second evaporator unit has completed cooling said cooling target; and said second time ratio indicates a third time period for supplying refrigerant to said first evaporator unit and a fourth time period for supplying refrigerant to said second evaporator unit, a ratio of said third time period with said fourth time period being greater than a ratio of said first time period with said second time period in said first time ratio, said second time ratio being used to relatively decrease refrigerant flow to said second evaporator.

13. A vehicular air conditioning apparatus according to claim 12, wherein said third time period of said second time ratio is longer than said first time period of said first time ratio.

14. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying refrigerant to said second evaporator unit even after said cooling operation completion determination means determines that said second evaporator unit has completed cooling said cooling target;

a first switch which actuates said first evaporator unit;

a second switch which actuates said second evaporator unit; and an evaporator temperature sensor for detecting an evaporator temperature around said first evaporator unit, wherein:

when both said first switch and said second switch are being actuated, said refrigerant supply control means supplies refrigerant to said first evaporator unit for a predetermined first supply time interval, said refrigerant supply control means terminating supply of refrigerant to said first evaporator unit and supplying refrigerant to said second evaporator unit after said first supply time interval elapses;

when both said first switch and said second switch are being actuated, said refrigerant supply control means terminates supply of refrigerant to said first evaporator unit and supplies refrigerant to said second evaporator unit when said evaporator temperature detected by said evaporator temperature sensor is no more than a first threshold temperature; and when both said first switch and said second switch are being actuated, said refrigerant supply control means supplies refrigerant to said second evaporator unit for a predetermined second supply time interval, said refrigerant supply control means terminating supply of refrigerant to said second evaporator unit and supplying refrigerant to said first evaporator unit after said second supply time interval elapses and when said evaporator temperature detected by said evaporator temperature sensor exceeds a second threshold temperature.

15. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying refrigerant to said second evaporator unit even after said cooling operation completion determination means determines that said second evaporator unit has completed cooling said cooling target;

a first switch which actuates said first evaporator unit;

a second switch which actuates said second evaporator unit;

a fluid line provided in said refrigerating cycle; and a pressure sensor which detects refrigerant pressure of refrigerant in said fluid line, wherein:

when at least one of said first switch and said second switch is being actuated, said refrigerant supply control means supplies refrigerant to said second evaporator unit for a first prescribed time period when said refrigerant pressure detected by said pressure sensor is less than a predetermined pressure level.

16. A vehicular air conditioning apparatus according to claim 15, wherein when said first switch is actuated and said refrigerant pressure detected by said pressure sensor is less than said predetermined pressure level, said refrigerant supply control means supplies refrigerant to said second evaporator unit for said first prescribed time period and supplies refrigerant to said first evaporator unit for a second prescribed time period after said first prescribed time period elapses.

17. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying refrigerant to said second evaporator unit even after said cooling operation completion determination means determines that said second evaporator unit has completed cooling said cooling target;

a first switch which actuates said first evaporator unit, wherein:

when said first switch is actuated, said refrigerant supply control means supplies refrigerant to said first evaporator unit for a first preset time period after the actuation of said first switch; and after the elapse of said first preset time period, said refrigerant supply control means supplies refrigerant alternately to said first evaporator unit and said second evaporator unit based on a preset time ratio for a predetermined number of times.

18. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying refrigerant to said second evaporator unit even after said cooling operation completion determination means determines that said second evaporator unit has completed cooling said cooling target;

said refrigerating cycle further includes a pressure expansion valve and a switching valve;

said pressure expansion valve and said switching valve are coupled in series and are disposed proximate to an inlet side of said second evaporator unit;

said pressure expansion valve is disposed between said switching valve and said second evaporator unit;

said switching valve is provided proximate to said pressure expansion valve;

wherein the air conditioning refrigerating cycle also includes a check valve located at an outlet of the first evaporator unit, the refrigerant supply control means selectively supplying refrigerant to the second evaporator unit even after cooling operation completion when a second refrigerant pooling parameter indicates that refrigerant is pooling in the second evaporator due to backflow from an outlet of the first evaporator unit into the outlet of the second evaporator unit caused by a decrease in differential pressure at the check valve.

19. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target; and wherein the air conditioning refrigerating cycle also includes a check valve located at an outlet of the first evaporator unit, the refrigerant supply control means selectively supplying refrigerant to the second evaporator unit even after cooling operation completion when a sensed refrigerant pooling parameter indicates that refrigerant is pooling in the second evaporator due to backflow from an outlet of the first evaporator unit into the outlet of the second evaporator unit caused by a decrease in differential pressure at the check valve.

20. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying a smaller amount of refrigerant to said second evaporator unit compared to a refrigerant amount supplied thereto before said second evaporator unit has completed cooling said cooling target even after said cooling operation completion determination means determines that said second evaporator unit has completed cooling said cooling target; and wherein the refrigerant supply control means is for selectively supplying refrigerant to the second evaporator unit even after cooling operation completion when a sensed refrigerant pooling parameter indicates that refrigerant is pooling in the second evaporator due to backflow from an outlet of the first evaporator unit into the outlet of the second evaporator unit.

21. A vehicular air conditioning apparatus for use in a vehicle, said apparatus comprising:

a refrigerating cycle which includes a first evaporator unit that is capable of cooling a cabin of a vehicle and a second evaporator unit that is capable of cooling a cooling target, said second evaporator unit being disposed in parallel with said first evaporator unit;

cooling operation completion determination means for determining that said second evaporator unit has completed cooling said cooling target;

refrigerant supply control means for selectively supplying refrigerant to said first evaporator unit and to said second evaporator unit, said refrigerant supply control means being for supplying refrigerant to said second evaporator unit even after said cooling operation completion determination means determines that said second evaporator unit has completed cooling said cooling target;

said refrigerating cycle further includes a pressure expansion valve and a switching valve;

said pressure expansion valve and said switching valve are coupled in series and are disposed proximate to an inlet side of said second evaporator unit;

said pressure expansion valve is disposed between said switching valve and said second evaporator unit;

said switching valve is provided proximate to said pressure expansion valve; and wherein the refrigerant supply control means is for selectively supplying refrigerant to the second evaporator unit even after cooling operation completion when a sensed refrigerant pooling parameter indicates that refrigerant is pooling in the second evaporator due to backflow from an outlet of the first evaporator unit into the outlet of the second evaporator unit.

* * * * *